(No Model.)
C. J. MOBER.
GRAIN CLEANER.
No. 520,653. Patented May 29, 1894.
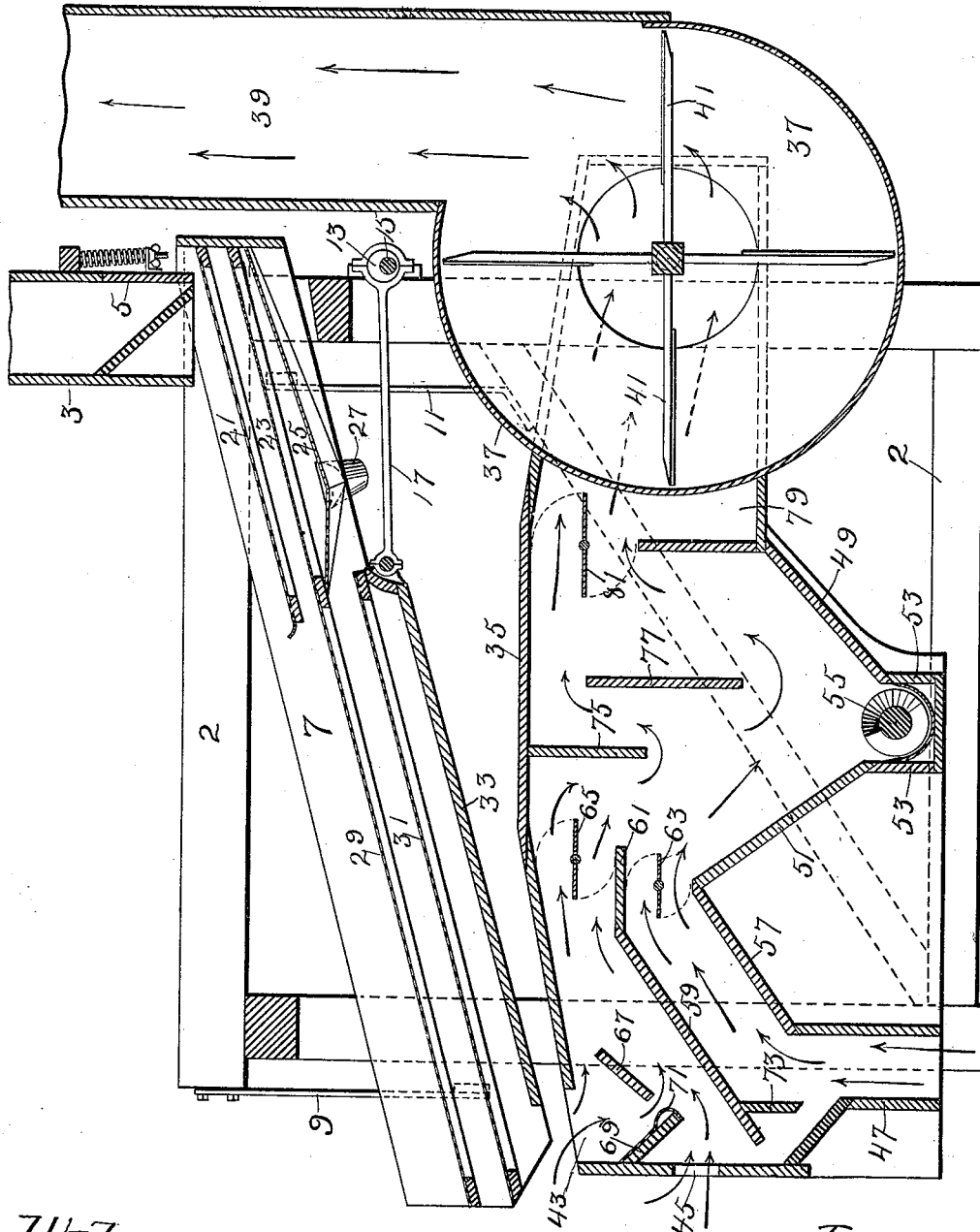
Witnesses
G. E. Purple
F. S. Lyon
Inventor
Charles J. Mober
By Paul & Hawley, Att'ys.

UNITED STATES PATENT OFFICE.

CHARLES J. MOBER, OF MINNEAPOLIS, MINNESOTA.

GRAIN-CLEANER.

SPECIFICATION forming part of Letters Patent No. 520,653, dated May 29, 1894.

Application filed June 15, 1893. Serial No. 477,636. (No model.)

*To all whom it may concern:*

Be it known that I, CHARLES J. MOBER, of the city of Minneapolis, county of Hennepin, State of Minnesota, have invented certain new and useful Improvements in Grain-Cleaners, of which the following is a specification.

This invention relates to improvements in grain cleaners, and the object of the invention is to provide a machine of this class in which the grain will be thoroughly cleaned and impurities removed therefrom.

To this end the invention consists, generally, in the constructions and combinations hereinafter described and particularly pointed out in the claim.

The accompanying drawing forming part of this specification is a longitudinal vertical section of a machine constructed in accordance with my invention.

In the drawing, 2 represents the frame of the machine of any suitable size and construction, provided with the spout 3 through which the grain is fed to the machine. This spout is provided with the hinged spring door or gate 5 through which the grain is fed to the sieves. 7 represents a suitable sieve frame that is mounted upon spring hangers 9 and 11, the hanger 9 at one end of the frame being preferably connected to the sieve and to the frame above the sieve, and the hanger 11 being connected to the sieve and to the frame below the sieve. These hangers thus form a balanced support for the sieve frame and permit it to be oscillated by means of the eccentric 13 on the shaft 15, and the eccentric strap and connecting rod 17 which is pivotally connected to the sieve frame. The grain passing out of the spout first falls upon a coarse sieve 21 having a spout 22 which takes out the straw and similar material. Beneath this is a sieve 23 which is preferably fine or of small mesh, and the small seeds pass through this sieve and are collected upon the plate 25 from which they are carried out of the machine through a suitable spout 27. Below the sieve 23 are the sieves 29 and 31 arranged one above the other and extending to the tail end of the sieve frame. Below the sieve 31 is the plate 33, by means of which all of the material passing through the sieve is carried to the lower end of the sieve frame. Beneath the seive frame 7 is the casing 35, having a fan casing 37 arranged at one end thereof and connected therewith and provided with the outlet spout 39. The casing 35 is provided at the end opposite that at which the fan is located with an opening 43 in its top wall, an opening 45 in its end wall, and with a discharge spout 47 forming an air-trunk at the bottom of said casing. The casing is also provided between the air trunk 47 and the fan with the settlings chamber, formed by the inclined bottom walls 49 and 51, and below this settlings chamber is a conveyer trough 53 within which is a suitable conveyer 55. An inclined wall 57 is arranged between the top of the air trunk 47 and the top of the inclined wall 51. Above the wall 57 and preferably parallel therewith is a partition 59, forming with said wall 57 an inclined air-trunk that extends from the top of the air-trunk 47 to the top of the settlings chamber. The space above the partition 59 and between that and the top wall of the casing forms another air-trunk, a horizontal plate 61 being preferably arranged at the upper end of the inclined wall 59, and suitable valves 63 and 65 are preferably arranged in these air trunks above and below the wall 61. Below the opening 43 are the inclined converging plates 67 and 69 having a narrow space between their lower edges, and the plate 69 is preferably provided with the covering or lining 71 having a bulge at its lower end. A vertical plate 73 is preferably arranged at the lower edge of the transverse partition 59 and this plate preferably forms the upper end of the air trunk 47, a narrow space being left between the lower edge of the transverse partition 59 and the wall of the casing, and between the lower edge of the cross-plate 73 and the wall of the casing, through which the material passes into the air trunk 47. Arranged in the settlings chamber, are the transverse partitions 75 and 77. The casing 35 is provided with the air trunk 79 leading to the eye or center of the fan casing, and in the machine as constructed there is preferably an air trunk of this kind upon each side of the fan casing. A valve 81 is arranged at the upper part of the casing in the opening leading into this trunk.

The operation of the machine is as follows: The grain being fed through the spout 5 falls onto the sieve 21, by which the straw and coarse material is taken out. The grain passes through this sieve and the fine seeds and similar material are taken out by the sieve 23 and carried out of the machine through the spout 27. By means of the sieves 29 and 31 the oats and similar material is taken out and the grain falls through upon the plate 33 from which it falls into the opening in the top of the casing 35. The current of air being drawn into the opening 43 simultaneously with the passage of the grain thereinto any dust or light material in the grain is drawn over the plate 67 and through the air trunk above the partition 59. As the grain passes between the plates 67 and 69 it is spread out into a thin sheet by reason of the bulge 71 on the lining in the plate 69. The grain is then subjected to another current of air drawn through the opening 45, which also passes through the air trunk above the partition 59. The grain then falls down into the air trunk 47 and is subjected to an upward current of air through said air trunk, this current passing through the trunk below the partition 59. These air currents are drawn across the settlings chamber below the transverse partition 75 and above and below the partition 77, and all of the material carried by the air current when it reaches this settlings chamber will, owing to the expansion of the air in this chamber and the retarding of the air current by means of the transverse partitions 75 and 77, drop into the bottom of the settlings chamber to be taken out by the conveyer 55. By means of the valves 63, 65 and 81 the air currents may be regulated through the various air-trunks. By this means the grain may be thoroughly cleaned and all of the light material removed therefrom, and all of that that is taken out by the air currents in the casing 35 may be deposited in the settlings chamber.

I claim as my invention—

The combination, with the casing 35, of the fan arranged at one end of said casing and connected therewith by a suitable air trunk 79, the valve 81 arranged in said air-trunk, a settlings chamber in said casing provided with a suitable conveyer, the openings 43 and 45 in the end of the casing farthest from said fan, the inclined plates 67 and 69 arranged below the opening 43, the vertical air trunk 47, and the inclined transverse partition 59 arranged above the air-trunk 47, the horizontal transverse partition 61 arranged at the upper edge of the partition 59, and the valves 63, 65 arranged in the air-trunks above and below the partitions 61, for the purpose specified.

In testimony whereof I have hereunto set my hand this 8th day of June, 1893.

CHARLES J. MOBER.

In presence of—
 A. C. PAUL,
 F. S. LYON.